(12) United States Patent
Wu et al.

(10) Patent No.: US 6,616,034 B2
(45) Date of Patent: Sep. 9, 2003

(54) RADIO FREQUENCY IDENTIFICATION DEVICE

(75) Inventors: Kung Chris Wu, Sunnyvale, CA (US); Chen Wu, Taipei (TW); Chien-Rong Huang, Hsin Chu (TW); Jui-Hung Hsu, Hsin Chu (TW)

(73) Assignee: Fortrend Taiwan Scientific Corporation, Hsin-Chu (TW)

( * ) Notice: Subject to any disclaimer, the term of this patent is extended or adjusted under 35 U.S.C. 154(b) by 0 days.

(21) Appl. No.: 10/007,106

(22) Filed: Dec. 10, 2001

(65) Prior Publication Data

US 2003/0106931 A1 Jun. 12, 2003

(51) Int. Cl.⁷ ............................................... G06F 17/00
(52) U.S. Cl. ...................................... 235/375; 235/380
(58) Field of Search ................................. 235/375, 380

(56) References Cited

U.S. PATENT DOCUMENTS

| | | | | |
|---|---|---|---|---|
| 4,500,080 A | * | 2/1985 | Aigo | .......................... 269/56 |
| 4,588,880 A | * | 5/1986 | Hesser | ....................... 235/376 |
| 4,827,110 A | * | 5/1989 | Rossi et al. | ................. 235/376 |
| 4,974,166 A | * | 11/1990 | Maney et al. | ............... 700/113 |
| 5,113,349 A | | 5/1992 | Nakamura et al. | |
| 5,151,684 A | | 9/1992 | Johnson | |
| 5,389,769 A | * | 2/1995 | Yamashita et al. | .......... 235/375 |
| 5,841,122 A | | 11/1998 | Kirchhoff | |
| 5,866,024 A | * | 2/1999 | de Villeneuve | ............. 235/493 |
| 5,873,070 A | | 2/1999 | Bunte et al. | |
| 5,892,441 A | | 4/1999 | Woolley et al. | |
| 5,929,414 A | | 7/1999 | Saitoh | |
| 5,963,134 A | | 10/1999 | Bowers et al. | |
| 6,104,311 A | | 8/2000 | Lastinger | |
| 6,105,004 A | | 8/2000 | Halperin et al. | |
| 6,170,742 B1 | | 1/2001 | Yacoob | |
| 6,194,993 B1 | | 2/2001 | Hayashi et al. | |
| 6,195,006 B1 | | 2/2001 | Bowers et al. | |
| 6,330,971 B1 | * | 12/2001 | Mabry et al. | ................ 235/383 |

* cited by examiner

Primary Examiner—Mark Tremblay
(74) Attorney, Agent, or Firm—John Vanden Bosche

(57) ABSTRACT

An identification system for tracking wafer carriers within a manufacturing facility. The system uses smart card technology in which an identification card is placed on each wafer carrier. The smart cards have memory for storing information about the wafer carrier. Power is transmitted to the card along with data so that the smart card does not require a separate power source. The devices for communicating with the smart cards can be stationary or they can be portable hand-carried devices. A network connects the readers to a central database.

30 Claims, 4 Drawing Sheets

RADIO FREQUENCY IDENTIFICATION DEVICE

FIELD OF THE INVENTION

The invention relates to the field of silicon wafer processing. Specifically, the invention relates to a system for identifying and tracking the contents of a wafer carrier in a wafer manufacturing facility.

BACKGROUND OF THE INVENTION

During the manufacture of semiconductor chips, it is necessary to subject a silicon wafer to a variety of processing steps. Processing steps can include, for instance, vapor deposition, heat treatment, photolithography, and cleaning. Each processing step occurs in an enclosed chamber and the wafer must be transported between chambers for subsequent processing steps. During transportation between chambers, the wafer must be kept perfectly clean. For this reason, chip manufacturing occurs in tightly controlled clean rooms in which dust and other contaminants are kept to a minimum. However, even within a clean room environment, the wafers are typically placed in a wafer carrier for protection while they are transported between processing chambers.

In a typical chip manufacturing line, wafer carriers filled with silicon wafers are moved from chamber to chamber on carts. Because some processes take longer than others, it is often necessary for a wafer carrier or a cart full of wafer carriers to enter a queue and wait for a processing chamber to become empty before the wafers are placed in the chamber for treatment. Human operators move the carts full of wafer carriers from location to location and they must keep track of which treatment processes are appropriate for each wafer carrier. Because different wafers can require various processing steps, the operators must keep close track of which processes are appropriate for a given wafer carrier full of wafers. Silicon wafers are relatively expensive and an error by a human operator can cause a significant loss.

In the past, chip manufacturers have tracked wafer carriers by placing bar codes on them. Human operators carry scanners that read the bar codes and instruct the operators regarding the appropriate processes for the wafers. This technique has the disadvantage that bar codes contain read-only information and can not be changed. The bar code is only used as an identifier and it is never updated. Any update of information regarding the wafer carrier must occur within a database connected to the operator's bar code reader. It would be desirable to have read-write capability for each wafer carrier's identification tag rather than using read-only bar codes.

Some chip manufacturers have begun to use personal data appliances (PDAs) such as a Palm Pilot™ to store information about the wafers in a wafer carrier. Information in a PDA can be updated and modified as needed to reflect the status of the wafer processing operations. The disadvantages with using a PDA as an identification device are that the PDAs have batteries that must be changed regularly or data can be lost. Also, PDAs are not waterproof and must be removed from the wafer carrier during washing.

SUMMARY OF THE INVENTION

The present invention provides a read-write identification tool for tracking the status of semiconductor wafers in a wafer carrier. The identification device is rugged and waterproof so that it can be washed together with a wafer carrier. Information stored in the identification device can be updated as necessary as the wafer carrier moves between processing chambers. Information about the wafer carrier can be read and written from a distance without physically contacting the identification device.

An identification card is attached to each wafer carrier to store and transmit information about the contents of the wafer carrier. The identification card contains a small integrated circuit (IC) chip and a small antenna. The antenna is used to send and receive data and power for the chip is supplied by transmission through the antenna. The identification card is approximately the size and shape of a standard credit card and it is hermetically sealed so that it is rugged and waterproof. The technology used for the identification card is similar to that used for "smart money" in which a plastic card contains an IC chip and an antenna to store and transmit data about the monetary value of the card.

A reader is supplied to work with the identification cards. The reader includes an antenna that can transmit data to and from the identification card and transmit power to the identification card. Because power is transmitted through the antenna, the identification card does not require a battery and can be made to be very compact.

The reader is in the shape of a wand that an operator can hold in his hand and point at the identification cards on various wafer carriers. Each time the wand is pointed at an identification card, data about the contents of the wafer carrier are transmitted back and forth. The wand contains database information about selected wafer carriers. Data is transmitted to the reader wand from a central database in a host computer via a network connection. The reader wand is connected to the network with a connection adapter that the wand can be placed into.

Based on the database information stored in the reader wand, the operator would be able to quickly determine the contents and status of the wafer carrier. The database information could inform the operator about the processing steps that remain to be completed for the wafers in the wafer carrier.

One aspect of the invention is that the reader wand can be used as a "sniffer." In this mode, identifying information about a specific wafer carrier is loaded into the reader wand and the reader wand can then be used to identify a particular wafer carrier of wafers from within a group of wafer carriers. On occasion, a group of wafer carriers may stack up in a waiting area. Each of the wafer carriers may contain different types of wafers and require different processing steps. To find a particular wafer carrier from the group can be difficult and time-consuming. However, the reader wand can be placed into sniffer mode and passed in front of each wafer carrier and to provide a visual or audible notification when it is passed in front of the desired wafer carrier. In this way, a human operator can identify a desired wafer carrier very quickly from a group of wafer carriers.

Another aspect of the invention is that a reader/writer unit is located at each processing station. The reader/writer reads information about each wafer carrier from the identification card on the wafer carrier as it enters the processing station. The reader/writer communicates with the manufacturing control system that operates the processing tool and associated material handling equipment. Based on information provided by the reader/writer, the wafers in the wafer carrier are either rejected or they are accepted and subjected to the process that is being performed in the processing station. After the wafers are processed, the reader/writer updates the identification card to indicate that the wafers have completed that step of processing. This prevents a batch of wafers from receiving incorrect processing steps and allows information about their progress in the manufacturing line to be stored locally in the identification card as well as centrally in the host computer's database.

BRIEF DESCRIPTION OF THE DRAWINGS

Other features and advantages of the invention will be apparent from the following Detailed Description taken in conjunction with the accompanying drawings, in which.

DETAILED DESCRIPTION OF THE INVENTION

Figure 1:
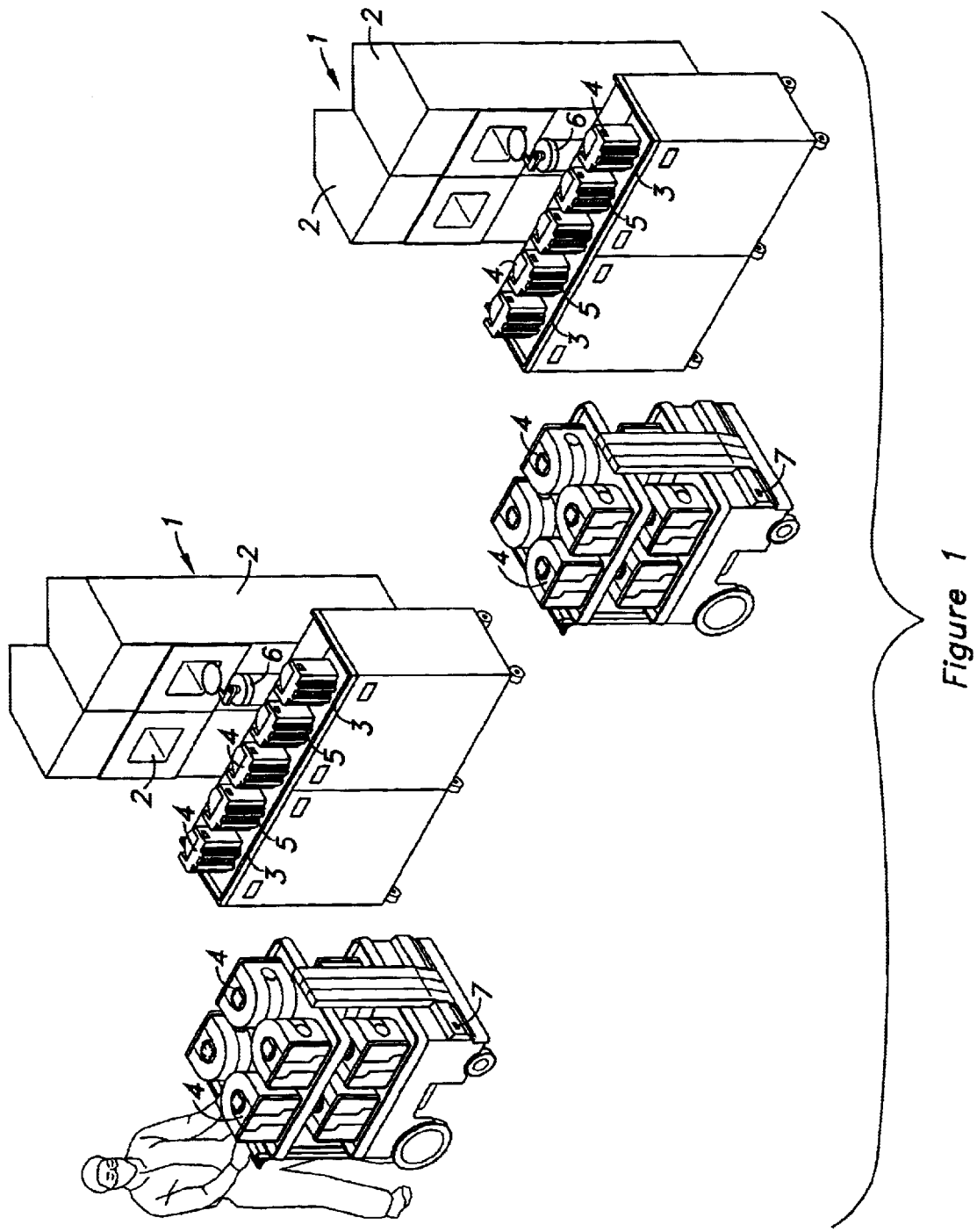
FIG. 1 is a perspective view of a portion of a semiconductor wafer manufacturing facility.

As shown in FIG. 1, a facility for manufacturing semiconductor wafers typically consists of several work stations 1 where various processes are performed on the wafers. Each work station 1 has a tool 2 which is a chamber or other device for performing a process on the wafer. The tools 2 can perform processes such as, for example, oxidation, photolithography, plasma etching, ion implantation, cleaning, vapor deposition, or heat treatment. Associated with each tool or set of tools 2 there is typically a staging area 3 which holds wafer carriers 4 of wafers 5 until the tool 2 is ready to receive the wafers 5. A robotic transfer system 6 is often used to transfer the wafers 5 from the wafer carriers 4 in the staging area 3 into the processing tool 2.

Wafer carriers 4 are moved between work stations on carts 7. A human operator or an autonomous vehicle moves the wafer carriers 4 from a cart 7 into the staging area 3. When the wafers have been processed, the wafer carriers 4 are moved back from the staging area 3 to the cart 7 by the human operator. The operator moves batches of wafer carriers 4 between various locations within the manufacturing facility as the wafers are subjected to the various manufacturing processes that are required. Some of the processes are more time-consuming than others and so it occasionally happens that a cart 7 of wafer carriers 4 will need to wait between work stations 1. Opportunities for human error exist during the movement of wafer carriers 4 between work stations 1. Also, when a cart 7 full of wafer carriers 4 is parked between work stations 1, it is possible that the human operator could lose track of which processes the wafers have been subjected to. If the wafers are subjected to an incorrect process step, then the wafers will be destroyed. Therefore, it is vitally important to be able to uniquely identify each wafer carrier of wafers and to ascertain which manufacturing processes it has been through and which are still required to be performed. Since different wafer carriers can contain different types of semiconductor wafers, the processing steps vary from wafer carrier to wafer carrier thereby complicating the task of keeping track of wafers.

Figure 2:
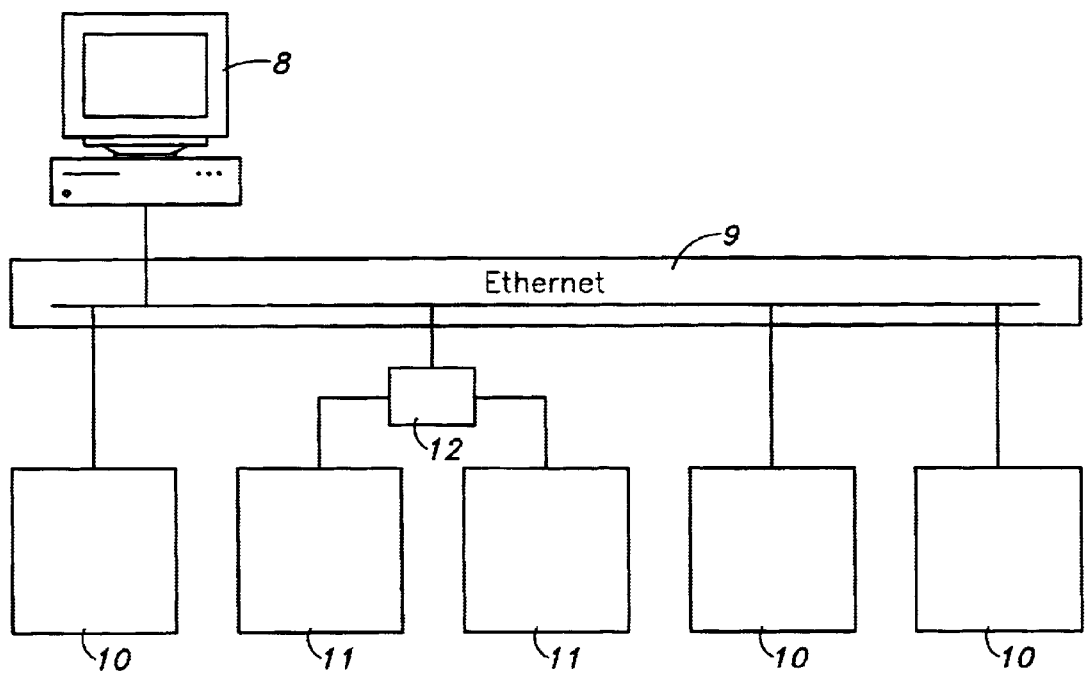
FIG. 2 is a block diagram of the radio frequency identification system of the present invention.

FIG. 2 shows the block diagram of an identification system that allows wafer carriers 4 of wafers 5 to be tracked accurately and efficiently. The system includes a host computer 8 that holds a database with information about all of the wafer carriers. Information stored in the database can include wafer carrier numbers, types of chips being manufactured, manufacturing processes and the order in which the processes must be performed, the progress of the wafer carrier within the manufacturing processes, last known location of the wafer carrier, and any other relevant information that the user may wish to store. All of the critical information for the identification system is stored in the host computer 8, although the host computer 8 may not always be available due to network difficulties, computer backup procedures, failure of computer equipment, or other reasons. Because of that, it is important that the system is configured so that wafer carriers can be identified and all of the database information is available even when the host computer 8 is unavailable.

The host computer 8 is preferably connected to the Manufacturing Execution System (MES) software that controls and monitors the entire manufacturing facility. In this way, up-to-date accurate information can be shared between all aspects of the manufacturing facility. The MES software is typically developed by the wafer fabricator and can include software modules from various equipment vendors. One of ordinary skill in the art would be able to integrate the wafer identification software of the present invention into the overall MES software package.

The host computer 8 is connected to an Ethernet network 9. The network can be a hard-wired network or it can be wireless. Standard communications protocol is used within the network. Connected to the Ethernet, there are a plurality of read/write devices. FIG. 2 shows three stationary reader/writer devices 10 and two mobile reader wands 11. The mobile reader wands 11 connect to the network through a network connection adapter 12. Each of the reader/writer devices 10 and the mobile reader wands 11 have enough memory and processing capability that they can operate independently of the host computer 8 in the event that the network connection is lost.

Figures 3, 4:
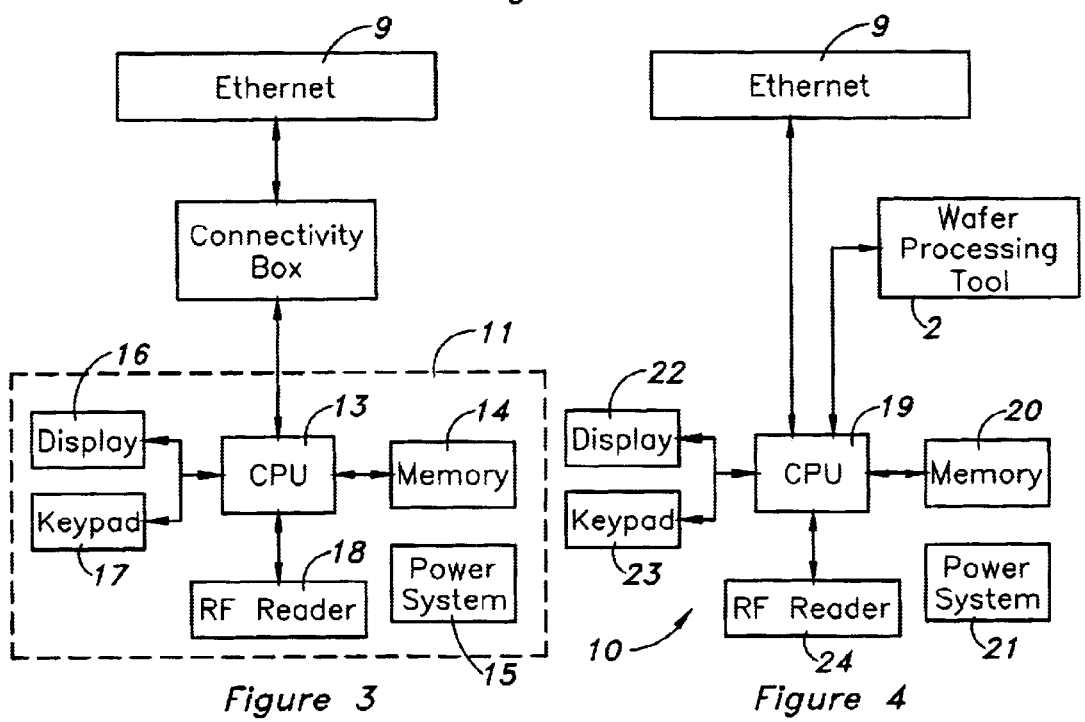
FIG. 3 is a block diagram of the reader wand of the present invention.
FIG. 4 is a block diagram of the stationary reader/writer of the present invention.

FIG. 3 shows a block diagram of a mobile reader wand 11. The wand 11 is connected to the system's Ethernet 9 through a connectivity adapter box 12. The connection adapter box 12 is a stationary base that receives the reader wand 11 for the purpose of synchronizing data with the database in the host computer 8. The reader wand 11, however, can be disconnected and removed from the connection adapter 12 and used independently of the host computer 8. Communication between the reader wand 11 and the connection adapter 12 is preferably achieved over an RS-232 connection at 9600 bps.

The reader wand 11 includes a CPU 13 that performs commands, manipulates data, and controls the overall operation of the reader wand. The CPU chip 13 is preferably similar to the Intel 8051 microprocessor although other brands or models could be used. One of ordinary skill in the art would be able to program the chip 13 to perform the necessary operations of the reader wand 11 and details of the programming are not given here.

The reader wand 11 also contains a memory chip 14. The memory chip 14 is critical to the invention. It allows the reader wand 11 to be used as a stand alone device when disconnected from the connectivity adapter box 12 and permits a human operator to carry the reader wand 11 throughout the wafer manufacturing facility. The memory chip 14 preferably has at least enough memory to store information about 10 wafer carriers 4 so that an operator can use the reader wand 11 for several operations before it is necessary to synchronize data with the host computer 8.

The reader wand 11 has a power system 15 that consists of a rechargeable battery and associated power regulation circuitry. The rechargeable battery in power system 15 should provide enough energy storage for the reader wand 11 to be used for at least 3 hours before recharging is required. The power system 15 preferably operates at 7.2 VDC.

The reader wand 11 has a display 16 and a keypad 17 to create a user interface. The user interface is important to allowing the reader wand 11 to be used as a stand-alone mobile device. Preferably the display 16 is an LCD display with at least two lines of text. The display 16 can also include status indicators such as LED lights and it can include an audible tone that alerts the operator when certain events occur. The keypad 17 can include any level of complexity and it could even be a fall keyboard. However, it is contemplated that it need only be a few keys to allow the operator to scroll between lines of text. The primary operator interface for entering substantial amounts of data is intended to be through the host computer 8 and so the reader wand 11 does not require a sophisticated user interface.

The reader wand 11 has an RF reader 18 that allows communication with the identification cards on the wafer carriers 4. The RF reader includes a proprietary transponder IC chip and an antenna that transmits both power and data to and from the identification cards.

FIG. 4 shows a block diagram for a stationary reader/writer 10. The stationary reader/writer 10 is similar to the reader wand 11 except that it is not adapted to be a mobile device. The reader/writer 10 is continuously connected to the Ethernet 9, although it contains enough processing power and memory to operate independently of the host computer 8. This reduces the burden on the host computer 8 and the Ethernet network 9 and it also allows the reader/writer 10 to continue to function during periods of network disruption or when there is a problem with the host computer 8. The reader/writer 10 also communicates with the controller for the wafer processing tool 2. This allows the process performed by the tool to be modified based on information contained in the identification tag describing the batch of wafers 5 in the wafer carrier 4. Also, the processing tool 2 is able to pass information to the reader/writer 10 after the wafers 5 have been successfully processed and that information can be stored in the identification card.

The reader/writer 10 includes a CPU 19, memory 20, a power system 21, a display 22, a keypad 23, and an RF reader 24. The CPU 19 is similar to the CPU 13 in the reader wand 11 except that the software would be different. The memory 20 would also be similar to the memory 14 in the reader wand 11. The power system 21 in the reader/writer 10 is permanently wired to the AC power system of the manufacturing facility. The power system 21 may contain some battery capability so that the power supply is uninterruptible, but it does not need nearly as much battery capability as the reader wand 11 requires. The display 22 and keypad 23 could be similar to the display 16 and keypad 17 of the reader wand 11, although it is possible to include a substantially more complicated user interface to allow more flexibility for data input at the work station 1. The RF reader 24 in the reader/writer 10 is similar to the RF reader 18 in the reader wand 11 except that the antenna might be sized differently based upon requirements for the distance between the identification tag on the wafer carrier 4 and the antenna in the RF reader 18.

Figure 5:
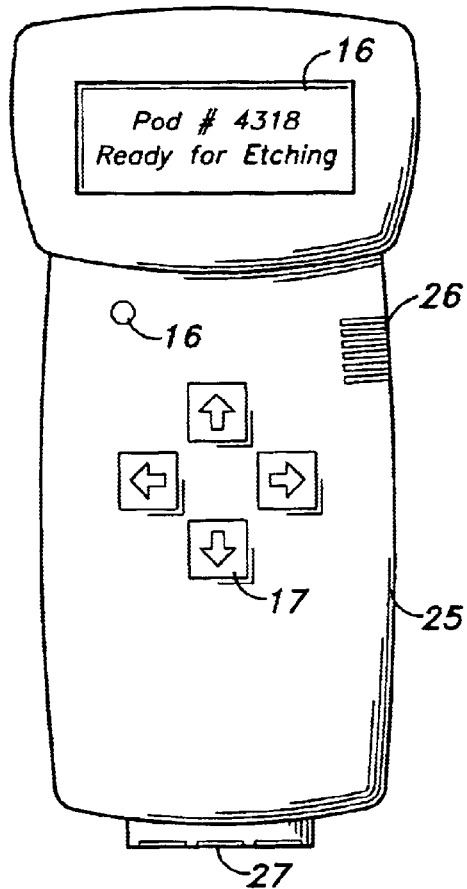
FIG. 5 is a perspective view of the reader wand of the present invention.

FIG. 5 shows the physical layout of the handheld reader wand 11. The reader wand has a case 25 that is made of plastic or a similar rugged material that will protect the device if it is dropped or bumped. The overall size and shape of the case 25 should be such that it can be comfortably held in the palm of the operator's hand. It should meet all relevant ergonomics standards. The reader wand 11 includes a display 16 that is preferably and LCD display with at least two lines of text display. As shown in FIG. 5, the text display can be used to show the number or other identification of a particular wafer carrier and the status of the wafers in the wafer carrier. Other display information could include information about the program stored in the CPU 13 of the reader wand 11, operational status of the reader wand 11, charge level of the batteries in the reader wand's power system, etc. The reader wand 11 is also shown in FIG. 5 as having an LED light 26 that can be used to convey status information or to alert an operator when a specific wafer carrier has been located. The wand 11 is also shown having openings 26 in the case 25 to allow sound to emanate from a speaker inside the case. The speaker can be used to provide an audible tone when a specific wafer carrier has been located. On the base of the case 25, there is a data port 27 that is used to connect the reader wand 11 to the network connection adapter 12. The data port 27 can be any desired shape or style that will allow simple and secure connection to the network adapter 12.

Figure 6:
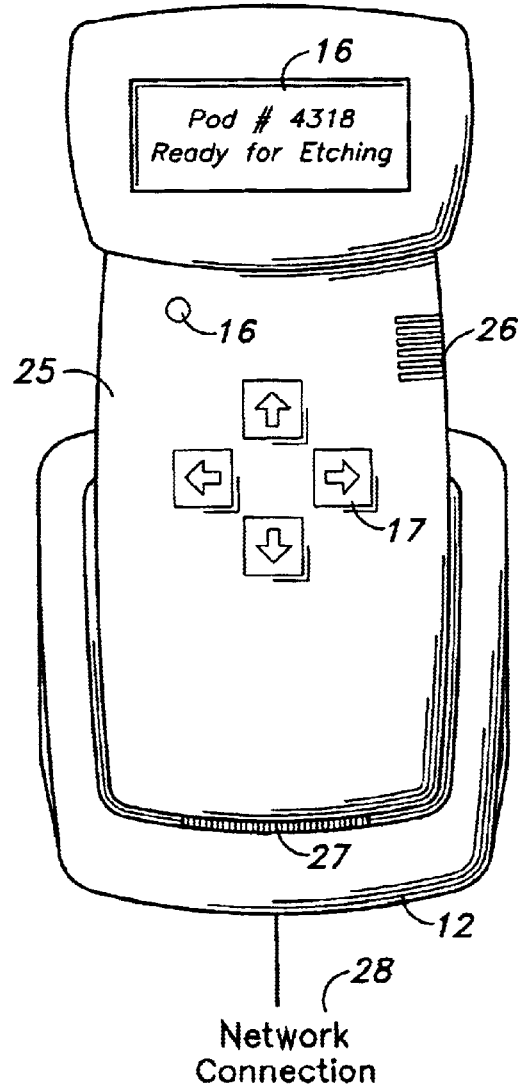
FIG. 6 is a perspective view of the reader wand of the present invention docked in its network connection adapter.

FIG. 6 shows the reader wand 11 attached to the network connection adapter 12. The network connection adapter 12 is shown as being in the form of a cradle that receives the reader wand 11. Within the network connection adapter 12 is a data port that mates with the data port 27 on the reader wand 11. The network connection adapter 12 also has a network connection 28 that places the network connection adapter 12 onto the Ethernet 9.

Figure 7:
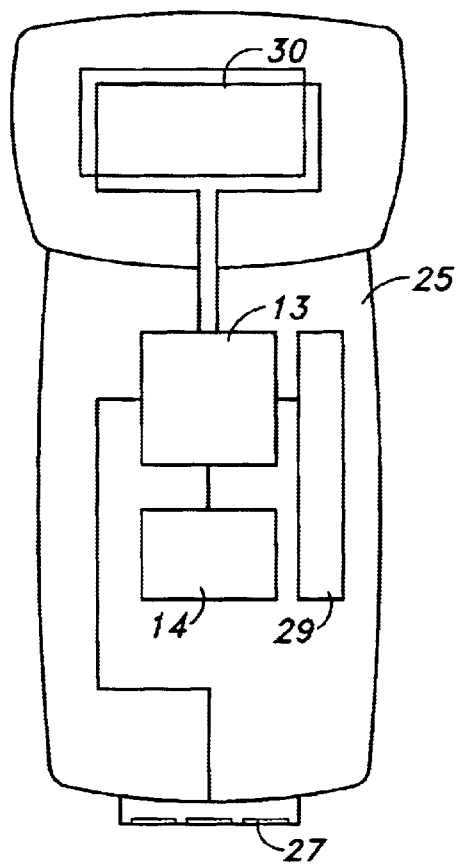
FIG. 7 is a breakaway view of the internal components of the reader wand of the present invention.

FIG. 7 shows selected internal components in the reader wand 11. The wand 11 contains a power system 29 which consists of a rechargeable battery and associated voltage regulation circuitry. The power system 29 provides power to the CPU chip 13. A memory chip 14 is electrically connected to the CPU 13 and stores information about wafer carriers 4 that are being searched for or that have been located. The CPU 13 is also electrically connected to the network connection data port 27. An important element of the reader wand 11 is the antenna 30 that transmits data to and from the identification card and that transmits power to the card. The antenna 30 is of conventional design and one of ordinary skill in the art would be able to select a suitable antenna. The frequency of the data transmission can be selected to provide a good balance between power consumption, transmission distance, data transmission rate, and special requirements in the manufacturing facility, and other considerations. The transmission frequency is preferably 13.56 MHz. The shape of the antenna 30 can be of various shapes and sizes. The shape of the antenna 30 in the reader wand 11 determines the shape of the antenna in the identification card. The size of the antenna 30 determines the distance over which data and power can successfully be transmitted to the identification card. In the preferred embodiment, the antenna 30 is shown as a loop antenna, although other antenna shapes could also work. In the preferred embodiment, the antenna 30 is approximately 30 mm by 50 mm in size. This allows communication with the identification card within a distance of approximately 65 mm.

Figure 8:
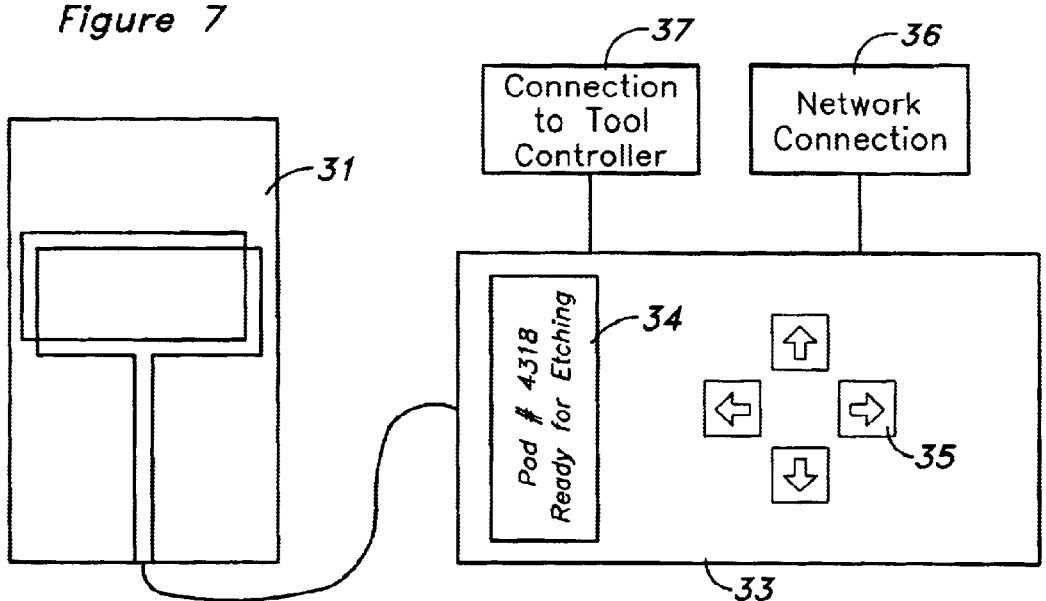
FIG. 8 is a perspective view of the stationary reader/writer of the present invention.

FIG. 8 shows the physical configuration of the stationary reader/writer unit 10. The reader/writer 10 includes an antenna 31 that is located in its own enclosure. The antenna 31 in the stationary reader/writer is preferably somewhat larger than the antenna 30 in the hand-held reader wand 11 to allow reading and writing of data at larger transmission distances. The antenna 31 is electrically connected to the body of the reader/writer 10 through a lanyard 32. The lanyard can be any suitable length to allow the antenna 31 and the reader/writer 10 to be placed at convenient locations.

The reader/writer 10 includes a user interface 33 that is mounted at a convenient location within the work station 1 to allow an operator to access the interface 33 at all times. The operator interface 33 includes a display 34 and a keypad 35. In FIG. 8, the display 34 and keypad 35 are shown as being similar to the display 22 and keypad 23 in the reader wand 11. However, the display 34 and keypad 35 of the reader/writer 10 could have significantly more complexity to allow a more sophisticated user interface with greater data entry capability.

The reader/writer 10 has a connection 36 to the Ethernet 9 and another connection 37 to the controller for the wafer processing tool 2. The Ethernet connection 36 is used to pass information about specific wafer wafer carriers 4 back and forth between the reader/writer 10 and the host computer 8. The connection 37 with the processing tool 2 allows information about the wafer carriers 4 to be passed back and forth with the control software for the tool 2. This allows the processing performed by the tool 2 to be modified based on the types of wafers 5 in the wafer carrier 4. It also allows information to be written to the wafer carrier's identification card when the process has been successfully completed by the tool 2. Reader/writer 10 is capable of operating as a stand alone device and has enough processing capability and memory that it does not need to rely on the Ethernet connection 36. Data is passed over the Ethernet connection 36 at certain intervals to synchronize data between the reader/writer 10 and the database in the host computer 8 and other than that the reader/writer 10 does not require the host computer 8 to operate properly.

Figure 9:
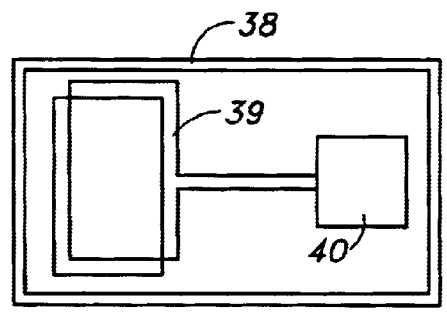
FIG. 9 is a perspective view of the identification card of the present invention.

FIG. 9 shows an identification card 38 that is attached to a wafer wafer carrier 4. The identification card 38 is hermetically sealed in a watertight enclosure so that it can be cleaned along with the wafer carrier 4 and does not ever need to be removed from the wafer carrier 4. In this way, the identification card 38 can store information about the wafer carrier 4 itself such as the age of the wafer carrier, service history, retirement schedule for the wafer carrier, etc. The identification card 38 includes an antenna 39 and an integrated circuit (IC) chip 40. The IC chip is preferably similar to the SM-05 chip manufactured by Legic® Identsystems although other brands or models could be used. Power for the IC chip 40 is transmitted through the antenna 39 so that no power system is required within the identification card. The antenna 39 should be sized and shaped appropriately to work with the antennas 30 and 31 in the reader wand 11 and the reader/writer 10. In the preferred embodiment the antenna 39 is a loop antenna, although other shapes can work as well. The IC chip 40 includes at least 256 bytes of non-volatile memory. It also includes processing capabilities to allow communication and reading and writing of data to the memory locations. The IC chip should be capable of writing data at least 100,000 times over its lifetime. It should be able to store data for up to 10 years without power back up and without losing any information. The communication protocol in the IC chip should include password protection for reading and writing data to ensure that data is not overwritten unintentionally.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

What is claimed is:

1. A system for tracking articles in a manufacturing environment comprising:
   a plurality of identification cards attached to said articles, said identification cards including memory and wireless connections for transmitting information about said articles;
   a portable reader wand with memory and a wireless connection for transmitting information about said articles to and from said identification cards;
   a central computer with a database of information about said articles; and
   an interruptible connection between said portable reader wand and said central database for transmitting information about said articles.

2. The system of claim 1 wherein said connection between said portable reader wand and said central database includes an adapter to which said reader wand can be removably connected.

3. The system of claim 2 wherein said adapter comprises a cradle in which said reader wand rests when connected to said central computer.

4. The system of claim 1 wherein said central computer includes a network and said connection between said portable reader wand and said central database includes a connection over said network.

5. The system of claim 1 further comprising a reader/writer with memory and a wireless connection for transmitting information about said articles to and from said identification cards wherein said reader/writer is located at a fixed position and is permanently connected to said central database.

6. The system of claim 5 wherein said central computer includes a network and said connection between said portable reader wand and said central database and said connection between said reader/writer and said central database include connections over said network.

7. The system of claim 6 comprising a plurality of said reader wands and a plurality of said reader/writers each of which is connected to said central database over said network.

8. The system of claim 1 wherein said reader wand comprises a keypad for an operator to input information and a display screen for an operator to read information.

9. The system of claim 8 wherein said central computer comprises an operator interface and wherein system programming is performed at said central computer and said keypad on said reader wand is only used to select functions that were previously programmed at said central computer.

10. The system of claim 5 wherein both said reader wand and said reader/writer comprise a keypad for an operator to input information and a display screen for an operator to read information.

11. The system of claim 10 wherein said central computer comprises an operator interface and wherein system programming is performed at said central computer and said keypads on said reader wand and said reader/writer are only used to select functions that were previously programmed at said central computer.

12. The system of claim 11 wherein the keypad on said reader/writer includes greater capability for operator input than the keypad on said reader wand.

13. The system of claim 1 wherein said information about said articles includes information about manufacturing processes that have been performed on said articles.

14. The system of claim 13 wherein said information about said articles includes information about manufacturing processes that are scheduled to be performed on said articles.

15. The system of claim 14 wherein said information about said articles can be modified in said identification cards, said reader wand, or said central database at an intermediate time between performance of various manufacturing processes.

16. The system of claim 1 wherein said manufacturing environment is a semiconductor wafer manufacturing environment and said articles are wafer carriers.

17. The system of claim 16 wherein said information about said articles comprises information about the wafers carried in said wafer carriers.

18. The system of claim 17 wherein said information about the wafers carried in said wafer carriers includes information about manufacturing processes that have been performed on said wafers.

19. The system of claim 18 wherein said information about said wafers includes information about manufacturing processes that are scheduled to be performed on said wafers.

20. The system of claim 19 wherein said information about said wafers can be modified in said identification cards, said reader wand, or said central database at an intermediate time between performance of various manufacturing processes.

21. The system of claim 20 wherein modification of said information about said wafers results in a different design of semiconductor wafer being manufactured.

22. A method for tracking semiconductor wafers in a manufacturing environment comprising the steps of:
   providing a plurality of wafer carriers with identification cards attached thereto wherein said identification cards include memory;
   providing a portable reader wand with memory and with wireless communication capabilities for transmitting information to and from said identification cards;
   providing a central database of information about said wafer carriers;
   transmitting information from said central database to the memory in said portable reader;
   disconnecting said portable reader wand from said central database;
   transmitting information from the memory in said portable reader wand to the memory in said identification cards;
   transmitting information from the memory in said identification cards to the memory in said portable reader wand;
   reconnecting said portable reader wand to said central database; and
   transmitting information from the memory in said portable reader wand to said central database.

23. The method of claim 22 wherein the step of transmitting information from said portable reader wand to said identification cards further comprises the step of transmitting power from said portable reader wand to said identification card.

24. The method of claim 23 wherein said step of transmitting information from said identification cards to said portable reader wand further comprises the step of transmitting power from said portable reader wand to said identification card.

25. The method of claim 23 wherein the step of transmitting information from said portable reader wand to said identification cards comprises passing said portable reader wand within a distance of less than 100 mm from said identification cards.

26. The method of claim 22 further comprising the steps of:
   providing a stationary reader/writer with memory and with wireless communication capabilities for transmitting information to and from said identification cards;
   transmitting information from said central database to the memory in said reader/writer;
   transmitting information from the memory in said reader/writer to the memory in said identification cards;
   transmitting information from the memory in said identification cards to the memory in said reader/writer;
   transmitting information from the memory in said reader/writer to said central database.

27. A method of identifying a specific wafer carrier within a semiconductor manufacturing environment comprising the steps of:
   providing a plurality of wafer carriers with identification cards attached thereto wherein said identification cards include memory;
   providing a portable reader wand with memory and with wireless communication capabilities for transmitting information to and from said identification cards;
   providing a central database of information about said wafer carriers;
   transmitting information from said central database to the memory in said portable reader wherein said information uniquely identifies said specific wafer carrier;
   disconnecting said portable reader wand from said central database;
   transmitting information from the memory in said portable reader wand to the memory in said identification cards;
   transmitting information from the memory in said identification cards to the memory in said portable reader wand;
   generating a visual or audible signal when the information transmitted from the memory in one of said identification cards indicates that it is attached to said specific wafer carrier.

28. The method of claim 27 wherein the step of transmitting information from said portable reader wand to said identification cards further comprises the step of transmitting power from said portable reader wand to said identification card.

29. The method of claim 27 wherein said step of transmitting information from said identification cards to said portable reader wand further comprises the step of transmitting power from said portable reader wand to said identification card.

30. The method of claim 27 wherein the step of transmitting information from said portable reader wand to said identification cards comprises passing said portable reader wand within a distance of less than 100 mm from said identification cards.

* * * * *